(12) United States Patent
Whitney et al.

(10) Patent No.: US 8,798,835 B2
(45) Date of Patent: Aug. 5, 2014

(54) HYBRID DIESEL-ELECTRIC POWERTRAIN SMOKE LIMIT AVOIDANCE

(75) Inventors: Christopher E. Whitney, Commerce, MI (US); Luca Scavone, Moncalieri (IT); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/616,895

(22) Filed: Sep. 14, 2012

(65) Prior Publication Data

US 2013/0325228 A1  Dec. 5, 2013

Related U.S. Application Data

(60) Provisional application No. 61/655,723, filed on Jun. 5, 2012.

(51) Int. Cl.
| | |
|---|---|
| *G06F 17/00* | (2006.01) |
| *G06F 7/00* | (2006.01) |
| *G05D 3/00* | (2006.01) |
| *G05D 1/00* | (2006.01) |
| *B60L 11/00* | (2006.01) |
| *B60L 9/00* | (2006.01) |

(52) U.S. Cl.
USPC .............................................. 701/22; 701/21

(58) Field of Classification Search
USPC ......... 701/22, 48, 54, 101, 105, 104, 108, 50, 701/109, 102, 110; 180/65.245, 65.285, 180/65.31, 197, 185, 196, 65.25; 123/395, 123/478
See application file for complete search history.

(56) References Cited

U.S. PATENT DOCUMENTS

| 8,140,206 | B2 * | 3/2012 | Bailey et al. ..................... 701/22 |
| 8,424,302 | B2 * | 4/2013 | Morinaga et al. ............... 60/431 |
| 8,428,805 | B2 * | 4/2013 | Bailey et al. ..................... 701/22 |
| 8,478,470 | B1 * | 7/2013 | Meads et al. ..................... 701/22 |
| 8,682,546 | B2 * | 3/2014 | Otsuka et al. ................... 701/54 |
| 2010/0070120 | A1 * | 3/2010 | Bailey et al. ..................... 701/22 |
| 2011/0139117 | A1 * | 6/2011 | Kar et al. ......................... 123/395 |
| 2012/0101691 | A1 * | 4/2012 | Otsuka et al. ................... 701/48 |
| 2012/0116627 | A1 * | 5/2012 | Bailey et al. ..................... 701/22 |

\* cited by examiner

*Primary Examiner* — Thomas Black
*Assistant Examiner* — Robert Payne
(74) *Attorney, Agent, or Firm* — Quinn Law Group, PLLC

(57) ABSTRACT

A hybrid diesel-electric powertrain includes a diesel engine in power flow communication with an electric motor and a controller. The diesel engine and electric motor are each configured to generate a respective torque in response to a provided torque command. The controller is in communication with the electric motor, the diesel engine, and an accelerator pedal, and configured to receive a driver torque request from the accelerator pedal. In response to the driver torque request, the controller is further configured to command the diesel engine to generate an output torque that is less than a smoke limit torque, and command the electric motor to generate an output torque equal to the difference between the driver torque request and the output torque of the diesel engine.

14 Claims, 2 Drawing Sheets

HYBRID DIESEL-ELECTRIC POWERTRAIN SMOKE LIMIT AVOIDANCE

CROSS REFERENCE TO RELATED APPLICATIONS

This application claims the benefit of U.S. Provisional Application No. 61/655,723, filed Jun. 5, 2012, which is hereby incorporated by reference in its entirety.

TECHNICAL FIELD

The present invention relates to hybrid diesel powertrain control.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power the vehicle systems. The HEV generally employs one or more electric machines (motor/generators) that operate individually or in concert with the internal combustion engine to propel the vehicle. The electric machines convert kinetic energy into electrical energy which may be stored in an energy storage device. The electrical energy from the energy storage device may also be converted back into kinetic energy for propulsion of the vehicle.

In a diesel engine, combustion of an overly rich fuel mixture may result in the generation of a carbon-based smoke. This smoke generation often defines a torque-load limit (i.e., the smoke limit), above which the fuel cannot be completely combusted. While it is possible to obtain more additional engine torque by exceeding the smoke limit (as it is considerably lean of the stoichiometric ratio), the resultant combustion is highly inefficient and any extra power comes at the cost of reduced combustion efficiency, high fuel consumption, and exhaust smoke.

SUMMARY

A hybrid diesel-electric powertrain includes a diesel engine in power flow communication with an electric motor and a controller. The diesel engine and electric motor are each configured to generate a respective torque in response to a provided torque command. The controller is in communication with the electric motor, the diesel engine, and an accelerator pedal, and configured to receive a driver torque request from the accelerator pedal. The controller may be further configured to smooth the driver torque request to eliminate any high-frequency noise from the signal. The controller may include a hybrid control module in communication with the electric motor; and an engine control module in communication with the diesel engine.

In response to the driver torque request, the controller may be configured to command the diesel engine to generate an output torque that is less than a smoke limit torque, and command the electric motor to generate an output torque equal to the difference between the driver torque request and the output torque of the diesel engine. The smoke limit torque may be a function of available air flow to the diesel engine.

The controller may be further configured to optimize the torque commanded of the diesel engine and of the electric motor such that the torque commanded of the diesel engine is less than an efficiency limit torque when the torque commanded of the electric motor is less than a maximum torque limit. As may be appreciated, the efficiency limit torque is less than the smoke limit torque by a predetermined amount. If the torque commanded of the electric motor equals a maximum torque limit for the motor, the controller may then command a torque output of the diesel engine that is greater than the efficiency limit torque, though still less than the smoke limit torque.

Similarly, a method of controlling a vehicle powertrain having an electric motor in power-flow communication with a diesel engine includes: receiving a driver torque request; smoothing the driver torque request; commanding the diesel engine to generate an output torque that is less than a smoke limit torque; and commanding the electric motor to generate an output torque equal to the difference between the smoothed driver torque request and the output torque of the diesel engine.

The above features and advantages and other features and advantages of the present invention are readily apparent from the following detailed description of the best modes for carrying out the invention when taken in connection with the accompanying drawings.

DETAILED DESCRIPTION

Figure 1:
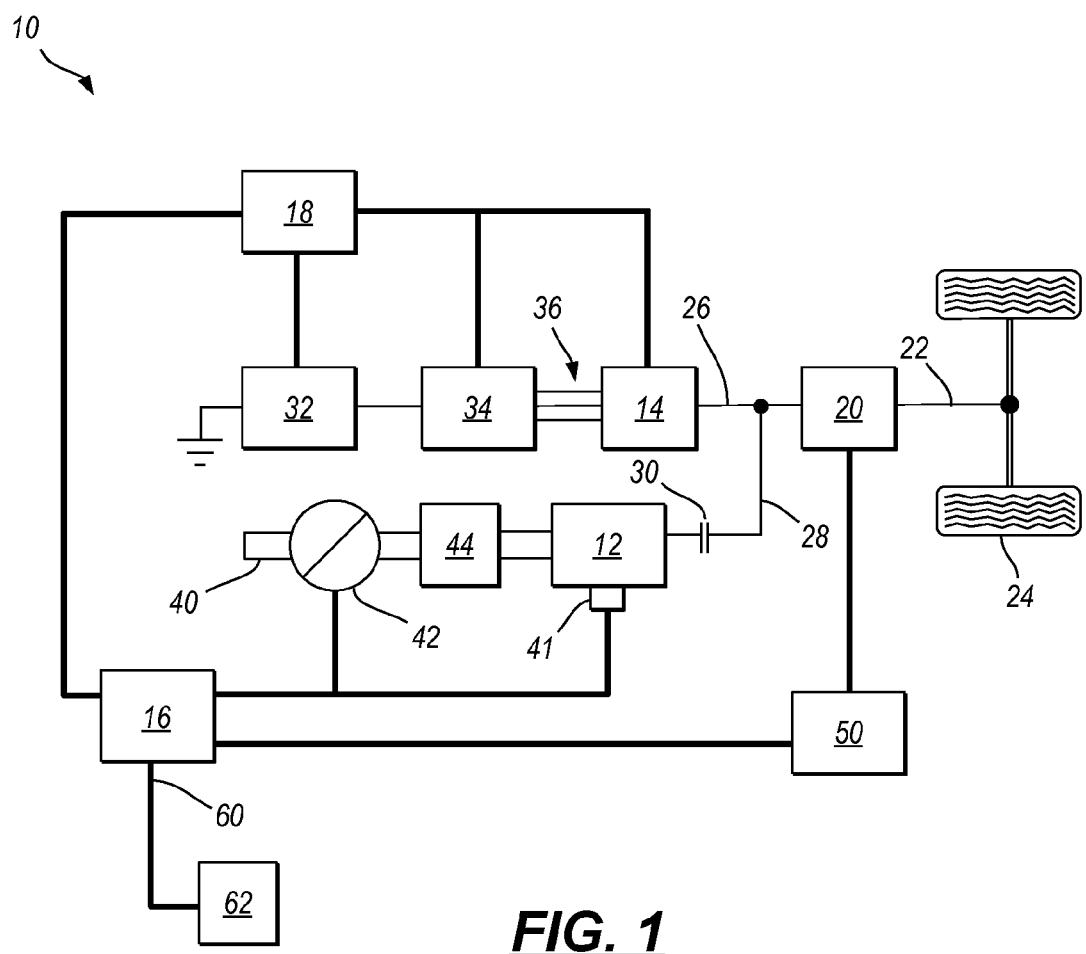
FIG. 1 is a schematic diagram of a hybrid diesel-electric powertrain in communication with an engine control module, transmission control module, and hybrid control module.

Referring to the drawings, wherein like reference numerals are used to identify like or identical components in the various views, FIG. 1 schematically illustrates a hybrid powertrain 10 for a hybrid diesel-electric vehicle. The hybrid powertrain 10 may include an internal combustion engine 12 in mechanical communication with an electric traction motor 14 (electric motor 14). The internal combustion engine 12 may generally be controlled by an engine control module 16 (ECM 16), while the electric motor 14 may generally be controlled by a hybrid control module 18 (HCM 18). The ECM 16 and HCM 18 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. Each module 16, 18 may be configured to automatically perform one or more control/processing routines that may be embodied as software or firmware associated with the module 16, 18.

While FIG. 1 generally illustrates one particular configuration of a hybrid diesel-electric vehicle, other arrangements may be similarly applicable to the presently described technology. Likewise, additional electric motors may be included in various arrangements within the powertrain 10 to serve as the primary movers for the hybrid vehicle. As such, the engine 12 and electric motor(s) 14 may be in power-flow communication with each other and with a transmission 20 to ultimately power a drive shaft 22 and one or more drive wheels 24.

The electric motor 14 may provide one source of torque via a motor output shaft 26. Similarly, the engine 12 may generate torque via a crankshaft 28, which may be selectively coupled with the motor output shaft 26 through a clutch 30 and/or one or more planetary gear sets (not shown). Torque from the crankshaft 28 can be used to directly propel the vehicle 10, and/or to drive the electric motor 14 as a generator to recharge a traction battery 32.

The electric motor 14 may be embodied as a multi-phase permanent magnet/AC induction machine rated for approximately 60 volts to approximately 300 volts or more depending on the vehicle design. The electric motor 14 may be electrically connected to the traction battery 32 via a power inverter module (PIM) 34 and a high-voltage bus bar 36. The PIM 34 may generally be configured for converting DC power to AC power and vice versa as needed. The battery 32 may be selectively recharged from torque applied to the electric motor 14 when that motor 14 is actively operating as generator, e.g., by capturing energy during a regenerative braking event or when being driven by the engine 12. As may be appreciated, the electric motor 14 may be an electric motor, an electric generator, a motor/generator, or any combination thereof. In some embodiments, such as plug-in HEV (PHEV), the battery 32 may also be recharged via an offboard power supply (not shown) when the vehicle 10 is idle.

The engine 12 may be in fluid communication with an air intake 40 and one or more fuel injectors 41. The air intake 40 may be configured to provide a supply of fresh air to the engine, where the air may mix with the fuel from the fuel injector 41. A variable throttle 42 may controllably modulate the flow of air from the intake 40 to the engine 12, under the direction of the ECM 16. Likewise, the ECM 16 may control the flow of fuel into the engine 12 via the one or more fuel injectors 41. In one configuration, an intake manifold 44 may be disposed between the throttle 42 and the engine 12 to allow the intake are to evenly flow into the engine 12.

During vehicle propulsion, the ECM 16 may vary the torque produced engine 12 by selectively modifying the behavior of one or more "torque actuators." In general, a torque actuator is a controllable aspect of the engine that may selectively increase or decrease the torque output at the crankshaft 28. Torque actuators may generally fall into two categories: slow-response actuators and fast-response actuators. Fast-response actuators can effect a near-immediate (e.g., 20-50 ms) change in engine output torque, such as by spraying more or less fuel into a cylinder, retarding a spark (in a gasoline engine), changing variable cam phasers, and/or increasing exhaust gas recirculation (EGR) to dilute the air/fuel mixture. Conversely, slow-response actuators may take many revolutions of the engine (e.g., 100-500 ms) to effect a torque change, and may often involve spooling the engine from a lower speed to a higher speed. Slow-response actuators may include, for example, controlling the throttle 42 to increase/decrease the amount of air entering the engine 12, and/or changing boost-pressure via one or more compressors (e.g., turbochargers (not shown)).

In very general terms, and with many other variables fixed or ignored, as more oxygen-rich air and fuel are provided into the engine 12, more torque will be produced. By opening the throttle to its widest and least restrictive position, the engine 12 may operate at its highest long-term torque output (i.e., its maximum capacity).

The ECM 16 may use inputs from various sensors (e.g., intake sensors, manifold air pressure sensors, fuel sensors and/or air mass sensors) to estimate or calculate the torque capacity and capability of the engine 12. The ECM 16 may send the determined torque capacity, along with other measured or determined information, to the HCM 18, which may determine the most efficient manner to utilize the torque production capacity of the engine 12 and motor 14. In one embodiment, the HCM 18 may employ a torque optimization routine to arbitrate various torque requests in a manner that operates the engine at its most efficient state as often as possible. The HCM 18 may then determine the amount of torque the engine 12 should produce/supply and how much torque (positive or negative) the electric motor 14 should supply. The engine torque request may then be provided back to the ECM 16 to so that the ECM 16 may intelligently control the various engine torque actuators to track the torque request as closely as possible. Likewise, the HCM 18 may directly provide the motor torque request to the PIM 34 to control the motor 14. Generally, more accurate estimates of the torque capacity of the engine 12 allow more accurate optimization of the hybrid powertrain 10 by the HCM 18.

In addition to the ECM 16 and HCM 18, the powertrain 10 may further include a transmission control module 50 (TCM 50) that may supervise the operation of the transmission 20. The TCM 50 may be in communication with each of the ECM 16 and HCM 18, and, in an automatic transmission configuration, may aid in coordinating gear changes within the transmission 20. For example, during a gear change, the net torque transmitted through the transmission 20 may desirably be at some predetermined value that is lower than the driver-requested torque. In this manner, the ECM 16 and/or HCM 18 may momentarily override any driver-requested torque commands to facilitate the gear-change in cooperation with the TCM 50.

In one operating mode, the ECM 16/HCM 18 may cooperate to control the one or more torque actuators of the engine 12 in response to an instantaneous driver torque request 60 provided at an accelerator pedal 62 (note that in practice, such a torque request may be more gradual and/or noisy on its assent from no actuation to full actuation). In a configuration where the engine 12 is a diesel engine 12 (i.e., compression ignited), the driver torque request 60 may be received by the ECM 16 and initially filtered/smoothed to remove any high-frequency noise. The smoothed request may then be used to control the torque output of the engine 12 by varying the amount of fuel supplied to the engine 12 through the fuel injectors 41. The ECM 16 may then control the amount of air flow through the throttle 42 (along with any EGR) in response to the fuel command such that it maintains a desired fuel/air mixture to provide an efficient, clean combustion. While fuel supply is generally a fast-response torque actuator, to maintain a generally efficient burn, the fuel response may be artificially limited during normal acceleration as a function of the throttle/air flow dynamics. This manner of powertrain control is typically unlike a spark-ignited gasoline engine, where the driver torque request 60 is used to manipulate the throttle 42, and the fuel supply depends on available airflow.

Figure 2A:
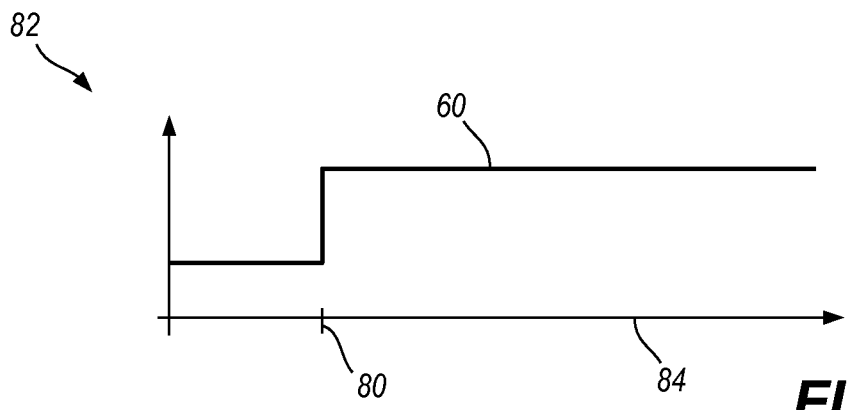
FIG. 2A is a schematic graph of a driver acceleration request as a function of time.
Figure 2B:
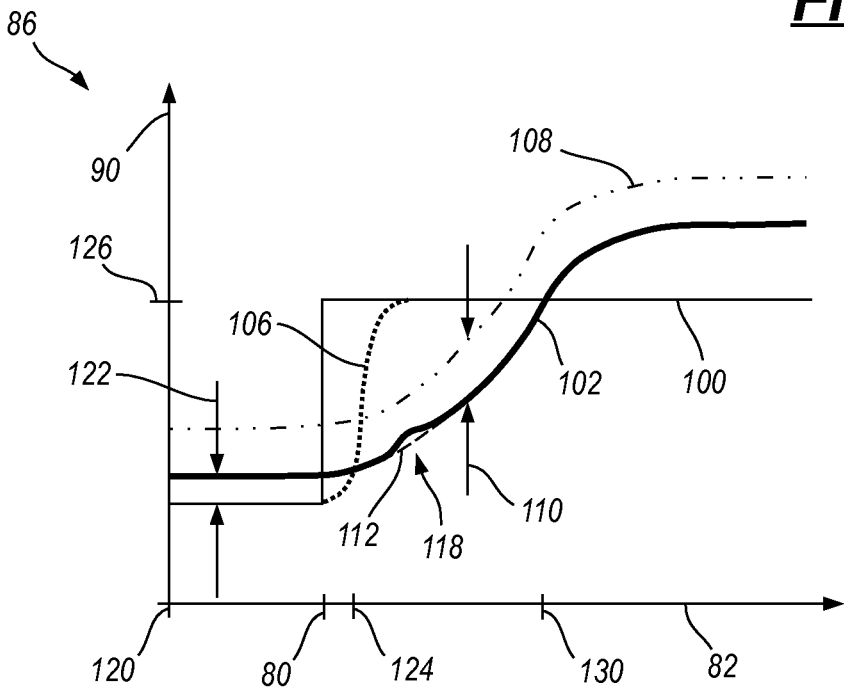
FIG. 2B is a schematic graph of desired powertrain torque and diesel engine output torque as a function of time.
Figure 2C:
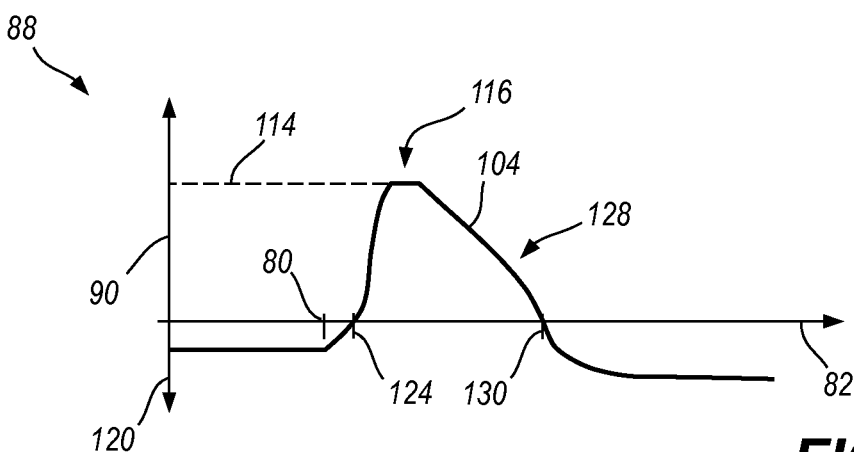
FIG. 2C is a schematic graph of commanded electric motor output torque as a function of time.

FIGS. 2A, 2B, and 2C generally illustrate a scenario where a driver accelerator pedal request 60 is "tipped in" or increased at a time 80. The graph 82 in FIG. 2A schematically illustrates such a request over time 84, while the second and third graphs 86, 88 (illustrated in FIGS. 2B and 2C, respectively) schematically depict torque 90 as a function of time 84. Each of the three figures/graphs 82, 86, 88, are respectively coordinated in time, however, the magnitude of the various curves is not necessarily shown to scale.

FIGS. 2B and 2C generally illustrates four different torque curves 100, 102, 104, and 106. Curve 100 represents the desired torque request 100 from the powertrain 10. This desired torque request 100 represents the driver's accelerator pedal request 60 converted to an acceleration torque request. Curve 106 is the commanded torque 106 that is smoothed/filtered from the desired torque request 100 and is generally the input to the engine/motor optimization performed by the HCM 18. Curve 102 is the commanded engine torque 102 that is provided to the ECM 14 by the HCM 18, curve 104 is the commanded motor torque 104 that is provided to the PIM 34. As may be appreciated, the commanded motor torque 104 and commanded engine torque 102 should sum to the curve 106 in a configuration where the motor and engine are on the same crankshaft.

As generally mentioned above, in diesel engines, combustion must be properly managed to provide a clean, efficient burn. As such, the ECM 16 may constrain the fuel response of the engine 12 as a function of the available fresh air flow at any given instant. Such a constraint may then be directly translated into a maximum amount of torque that is available at any one instant. This upper torque limit is generally referred to as the "smoke limit 108." As shown in FIG. 2, the smoke limit 108 may increase over time 82, though typically at a rate commensurate with the slow-response torque actuators.

In non-hybrid powertrains, the ECM 16 may allow the engine torque 102 to rise up to the smoke limit 108. Doing so, however, may result in a reduction in fuel economy/efficiency while also reducing the life of any exhaust aftertreatment particulate filter.

In the present system, the ECM 16 may attempt to maintain the engine torque 102 below the smoke limit 108 by at least a predetermined amount 110 (i.e., at an efficiency limit 112 that is less than the smoke limit 108). Unfortunately, under engine power alone, the powertrain may not accurately track the desired torque request 106. Therefore, the HCM 18 may instruct the electric motor 14 (via the PIM 34) to supplement the engine-supplied torque 102 with positive torque from the motor 14 where needed. Should the motor 12 reach a maximum torque limit 114, in one configuration, the motor torque 104 may saturate and the HCM 18 (generally at 116) may instruct the engine to increase the engine torque 102 above the efficiency limit (generally at 118). In such a configuration, the engine torque 102 may still be constrained against exceeding the smoke limit 108. In another configuration, instead of exceeding the efficiency limit, the HCM 18 may merely re-optimize the desired shaped torque 106 trajectory so that the motor does not reach its maximum torque limit 112.

Therefore, as generally illustrated in FIGS. 2A, 2B, and 2C, starting from an initial time 120, the commanded engine torque 102 may exceed a desired a desired output torque 100. This positive difference 122 may be offset by a negative motor torque 104 at the electric motor 12, which may be generating electricity to replenish the traction battery 32.

At the time 80 when the driver requested torque 60 tips in, the ECM 16 may send an increased desired torque request 100 to the HCM 18. The HCM 18 may instruct the ECM 16 to increase the engine torque 102 at the efficiency limit 112, while it concurrently begins increasing the motor torque 104. At time 124, the motor torque 104 may turn positive when the electric motor 14 begins consuming energy from the battery 32 to assist the engine 12. As the engine torque 102 increases toward the steady state level 126 of the desired output torque 100, the commanded motor torque 104 may decrease (generally at 128).

At time 130, the engine torque 102 may exceed the steady state level 126 of the desired output torque 100, wherein the HCM 18 may command the electric motor 14 to begin generating electricity to maintain the resultant torque 106 at the desired level 126. In this manner, the battery may recover for any expended energy during the acceleration assist.

In another configuration, the efficiency limit 112 may be a variable limit whereby penalties are assigned according to the engine torque's proximity to the smoke limit 108. The HCM 18 may account for such penalties when performing its engine/motor optimization, and only approach the smoke limit 108 to the degree necessary to balance powertrain response with fuel efficiency. Said another way, any usage of engine torque 104 above some efficiency limit 112 would be costed to comprehend that it would require extra fuel consumption to achieve.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of controlling a vehicle powertrain having an electric motor in power-flow communication with a diesel engine, the method comprising:
   receiving a driver torque request;
   smoothing the driver torque request;
   commanding the diesel engine to generate an output torque that is less than a smoke limit torque; and
   commanding the electric motor to generate an output torque equal to the difference between the smoothed driver torque request and the output torque of the diesel engine.

2. The method of claim 1, further comprising optimizing the torque commanded of the diesel engine and of the electric motor such that the torque commanded of the diesel engine is less than an efficiency limit torque when the torque commanded of the electric motor is less than a maximum torque limit; and
   wherein the efficiency limit torque is less than the smoke limit torque by a predetermined amount.

3. The method of claim 2, wherein the torque commanded of the diesel engine is greater than the efficiency limit torque and less than the smoke limit torque when the torque commanded of the electric motor is equal to a maximum torque limit.

4. The method of claim 1, wherein the driver torque request is provided via the actuation of an accelerator pedal.

5. The method of claim 1, wherein the smoke limit torque is a function of available air flow to the diesel engine.

6. A hybrid diesel-electric powertrain comprising:
   a diesel engine in power flow communication with an electric motor, the diesel engine and electric motor each configured to generate a respective torque in response to a provided torque command;
   a controller in communication with the electric motor, the diesel engine, and an accelerator pedal, the controller configured to:

receive a driver torque request from the accelerator pedal;

command the diesel engine to generate an output torque that is less than a smoke limit torque;

command the electric motor to generate an output torque equal to the difference between the driver torque request and the output torque of the diesel engine.

7. The hybrid diesel-electric powertrain of claim 6, wherein the controller is further configured to smooth the driver torque request prior to commanding the command the electric motor to generate an output torque.

8. The hybrid diesel-electric powertrain of claim 6, wherein the controller is further configured to optimize the torque commanded of the diesel engine and of the electric motor such that the torque commanded of the diesel engine is less than an efficiency limit torque when the torque commanded of the electric motor is less than a maximum torque limit; and wherein the efficiency limit torque is less than the smoke limit torque by a predetermined amount.

9. The hybrid diesel-electric powertrain of claim 8, wherein the torque commanded of the diesel engine is greater than the efficiency limit torque and less than the smoke limit torque when the torque commanded of the electric motor is equal to a maximum torque limit.

10. The hybrid diesel-electric powertrain of claim 6, wherein the smoke limit torque is a function of available air flow to the diesel engine.

11. The hybrid diesel-electric powertrain of claim 6, wherein the controller includes a hybrid control module in communication with the electric motor; and an engine control module in communication with the diesel engine.

12. A hybrid diesel-electric powertrain comprising:

a diesel engine in power flow communication with an electric motor, the diesel engine and electric motor each configured to generate a respective torque in response to a provided torque command;

a controller in communication with the electric motor, the diesel engine, and an accelerator pedal, the controller configured to:

receive a driver torque request from the accelerator pedal;

smooth the driver torque request;

command the diesel engine to generate an output torque that is less than an efficiency limit torque, the efficiency limit being lower than a smoke limit torque by a predetermined amount;

command the electric motor to generate an output torque equal to the difference between the smoothed driver torque request and the output torque of the diesel engine.

13. The hybrid diesel-electric powertrain of claim 12, wherein the smoke limit torque is a function of available air flow to the diesel engine.

14. The hybrid diesel-electric powertrain of claim 12, wherein the controller includes a hybrid control module in communication with the electric motor; and an engine control module in communication with the diesel engine.

* * * * *